3,296,244
COBALT-CONTAINING FORMAZANE
DYESTUFFS
Fabio Beffa, Basel, Paul Lienhard, Riehen, and Eginhard Steiner, Basel, Switzerland, assignors to J. R. Geigy A.-G., Basel, Switzerland
No Drawing. Filed Sept. 23, 1963, Ser. No. 310,898
Claims priority, application Switzerland, Oct. 3, 1962, 11,615/62, 11,616/62
17 Claims. (Cl. 260—145)

The present invention concerns new cobalt-containing formazane dyestuffs, processes for the production thereof, also their use for the dyeing and printing of textile materials containing natural and synthetic polyamide, as well as, as industrial product the material dyed or printed with these dyestuffs.

It is an object of this invention to provide formazane dyestuffs suitable for the dyeing of the above-described textile materials in various shades of grey and with better fastness properties, in particular better light and wet fastness than hitherto known dicyclically metallized formazane dyes possessing certain structural similarities.

It has been found that this object is attained, by the following dyestuffs according to a first aspect of the invention:

(a) 1:2 cobalt metal complex dyestuffs of a formazane of the formula

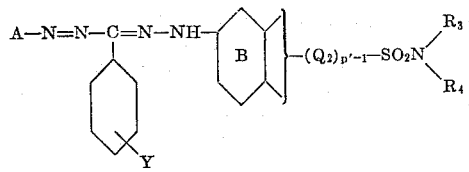

wherein each of $R_3$ and $R_4$ represents, independently of the other R, hydrogen, lower alkyl, cyano-lower alkyl, hydroxy-lower alkyl or lower alkoxy-lower alkyl;

$Q_2$ represents a bridge member which is phenylenesulfonyl, M-phenylene-aminosulfonyl, or N-lower alkyl-N-phenylene-sulfonyl, said bridge member being linked via its sulfonyl moiety to the ring B;

A represent one of the radicals of the formulas

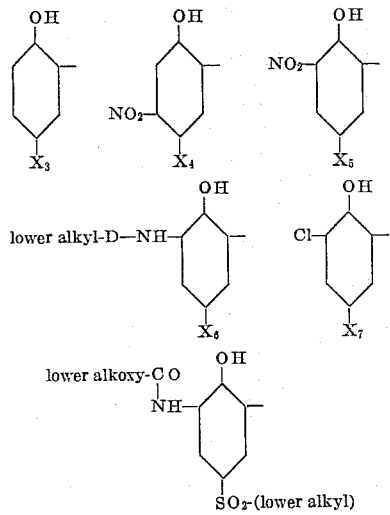

$X_3$ being nitro, chloro, bromo, alkyl of from 1 to 5 carbon atoms, lower alkyl-sulfonyl, lower alkanoylamino, N-lower alkyl-N-lower alkanoylamino, lower alkylsulfonylamino or N-lower alkyl-N-lower alkylsulfonylamino;

$X_4$ being chlorine, bromine or lower alkylsulfonyl, $X_5$ being chlorine, bromine, nitro or lower alkylsulfonyl, $X_6$ being nitro or lower alkylsulfonyl, $X_7$ being chlorine, or nitro, Y represents hydrogen, chlorine, bromine, lower alkyl, lower alkoxy or nitro, D represents —CO— or —SO$_2$—, and $p'$ is an integer ranging from 1 to 2.

(b) 1:2 cobalt metal complex dyestuffs of a formazane of the formula

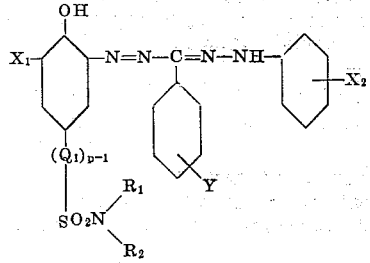

wherein each of $R_1$ and $R_2$ represents, independently of the other R, hydrogen, lower alkyl, cyano-lower alkyl, hydroxy-lower alkyl or lower alkoxy-lower alkyl;

$Q_1$ represents a bridge member which is phenylenesulfonyl, N-phenylene-aminosulfonyl, or N-lower alkyl-N-phenylene-sulfonyl, said bridge member being linked via its sulfonyl moiety to the ring A;

$p$ is an integer ranging from 1 to 2, $X_1$ is hydrogen or nitro;

$X_2$ is hydrogen, nitro, chlorine, bromine, lower alkoxy or lower alkyl; and

Y is hydrogen, chlorine, bromine, lower alkyl, lower alkoxy or nitro;

(c) 1:2 cobalt metal complex dyestuffs of a formazane of the formula

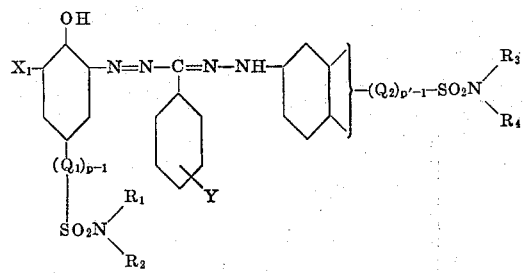

wherein each of $R_1$, $R_2$, $R_3$ and $R_4$ represents, independently of the other R's, hydrogen, lower alkyl, cyano-lower alkyl, hydroxy-lower alkyl or lower alkoxy-lower alkyl, Each of $Q_1$ and $Q_2$ represents a bridging member which is phenylenesulfonyl, N-phenylene-aminosulfonyl, or N-lower alkyl-N-phenylene-sulfonyl, said bridging member being linked via its sulfonyl moiety to the rings A and B, respectively, Of $p$ and $p'$ one is 1 and the other is an integer ranging from 1 to 2, Y represents hydrogen, chlorine, bromine, lower alkyl, lower alkoxy or nitro, And $X_1$ represents hydrogen or nitro.

(d) 1:2 cobalt metal complex dyestuffs of a formazane of the formula

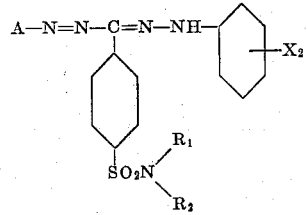

wherein each of $R_1$ and $R_2$ represents, independently of the other, hydrogen, lower alkyl, cyano-lower alkyl, hydroxy-lower alkyl or lower alkoxy-lower alkyl, And wherein $R_1$, $R_2$, A and $X_2$ have the meanings given hereinbefore.

"Lower" used in this specification and in the appended claims in connection with an aliphatic radical means that this radical has at least one and not more than 4 carbon atoms.

The foregoing as well as other valuable cobalt-containing formazane dyestuffs are obtained by reacting one mol of a formazane compound containing no salt-forming group which dissociates acid in water and which corresponds to the general Formula I

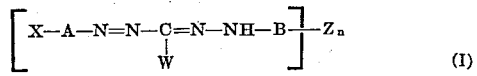

wherein

A represents an aromatic radical,

B represents an aromatic radical which does not contain any metallisable groups in the o-positions to the nitrogen bond, X represents a hydroxyl group in the o-position to the nitrogen bond to A.

W represents a saturated or unsaturated aliphatic hydrocarbon radical which may be substituted, a cycloaliphatic or aromatic hydrocarbon radical which may be substituted, or a heterocyclic radical having no ring nitrogen atoms, or the nitro or the cyano group, Z represents a sulfonic acid amide group which may be substituted at the amide nitrogen atom by low aliphatic groups which themselves may be substituted, it being possible for 2 nitrogen substituents together with the amide nitrogen atom to also form a heterocycle, and $n$ represents a low positive whole number, preferably one or two, or by reacting a mixture of formazane compounds of Formula I with an agent giving off less than one mol of cobalt to form a compound containing two molecules of formazane compounds of the Formula I to one cobalt atom.

The new cobalt-containing formazane dyestuffs thus obtained fall under the general Formula II

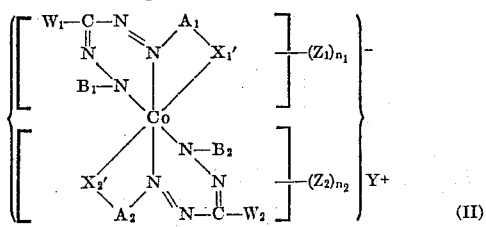

In this formula, $A_1$, $A_2$, $B_1$, $B_2$, $W_1$, $W_2$, $Z_1$, $Z_2$, $n_1$ and $n_2$ have the meanings given in Formula I for the symbols A, B, W, Z or $n$ respectively, $X_1'$ and $X_2'$ represent oxygen having two valences which is in o-position to the nitrogen bond from $A_1$ or $A_2$, Y is the equivalent of a cation, in particular an alkali metal ion such as the sodium or potassium ion.

A and B in Formula I are of, for example, the naphthalene or, preferably, the benzene series. The aromatic radicals A, B as well as, perhaps W also (W in the meaning of an optionally substituted aromatic hydrocarbon radical or a heterocyclic radical having no ring nitrogen atoms) can be further substituted as defined. They can contain non-ionogenic substituents, e.g., halogens such as fluorine, chlorine or bromine, aliphatic, cycloaliphatic, araliphatic or aromatic groups such as the methyl, ethyl, trifluoromethyl groups or hydroxyethyl, cyclohexyl, benzyl groups, optionally substituted phenyl groups, also alkoxy, cycloalkoxy, aralkoxy or aryloxy groups, or also cyano, nitro, alkylcarbonyl and arylcarbonyl groups such as acetyl or benzoyl groups, sulphonic acid amide or carboxylic acid amide groups, including N-substituted, preferably mono- or di-lower alkyl-, or N-lower alkyl-N-phenyl substituted carbamyl or sulphamyl groups, alkylsulphonyl and arylsulphonyl groups or alkyl sulphoxide and arylsulphoxide groups, or acylamino groups. As acylamino groups the carboacylamino groups are preferred, especially low alkanoylamino and N-low alkyl-N-low alkanoylamino groups, such as the acetylamino, propionylamino or N-methyl-N-acetylamino group; or low alkoxycarbonyl amino groups, such as the methoxycarbonylamino or the ethoxycarbonylamino group; or low alkylsulphonylamino and N-low alkyl-N-low alkyl-sulphonylamino groups, such as the methylsulphonylamino, ethylsulphonylamino and N-methyl-N-methyl sulphonylamino group.

W in the meaning of an optionally substituted saturated or unsaturated aliphatic hydrocarbon radical is, for example, the methyl, trichloromethyl, ethyl, n-propyl, propylene or n-butyl group. W in the meaning of an optionally substituted cycloaliphatic hydrocarbon radical is, e.g., the cyclohexyl group and, in the meaning of an optionally substituted aromatic hydrocarbon radical, it is, e.g., the phenyl group, the 1- or 2-naphthyl group. If W is a heterocyclic radical containing no ring nitrogen atoms then it is, e.g., the furyl-(2) or the thienyl-(2) radical. Heterocyclic rings containing nitrogen are not suitable as because of their basicity they tend to salt-formation causing change in shade.

Preferably W is the phenyl-, the 1- or 2-naphthyl group, as therewith dyestuffs with particular good fastness to light are obtained.

Z is a sulfonic acid amide group which may be substituted at the amide nitrogen atom by low aliphatic groups with preferably 1 to 4 carbon atoms such as, e.g., the sulfonic acid-amide, -methyl-amide, -ethylamine, -propylamide, -isopropylamide, -butylamide, -β-cyanoethylamide, -β - hydroxyethylamide, -β - methoxyethylamide, -β-ethoxyethylamide, -γ-methoxypropylamide, -γ-ethoxypropylamide, -N,N-dimethylamide, -N,N-diethylamide, N,N-dibutylamide, N,N-di-β-hydroxyethylamide, -N,N-di-γ-methoxypropylamide, -N,N-di-(β,γ-dihydroxypropyl) - amide, -N-methyl-N-β-hydroxyethylamide, -N-ethyl-N-β-hydroxyethylamide, -N-methyl - N - β,γ - dihydroxypropylamide, -N - ethyl - N - β,γ,dihydroxypropylamide or the -morpholide group.

Preferably Z is the —$SO_2NH_2$ group as this gives particularly good water solubility.

Z can be bound both to A, B or to W as well as to any external aromatic radicals of the dyestuff molecule; in the latter case, for example, to phenyl, phenoxy, phenylthio, benzyl, sulfonic acid phenylamide, sulfonic acid-N-alkyl-N-phenylamide, carboxylic acid phenylamide, aroylamino, phenylsulfonyl or phenylcarbonyl groups.

Valuable, easily accessible cobalt-containing formazane dyestuffs having good water solubility which are distinguished by good dyeing properties are derived from formazane compounds of Formula I in which A is a radical of the benzene series containing the hydroxyl group in o-position to the nitrogen bond, B is a radical of the benzene or naphthalene series containing no metallisable groups in the o-positions to the nitrogen bond, and W is a radical of the benzene or naphthalene series.

Particularly valuable cobalt-containing formazane dyestuffs according to the invention of this preferred class are derived from formazane compounds of Formula III

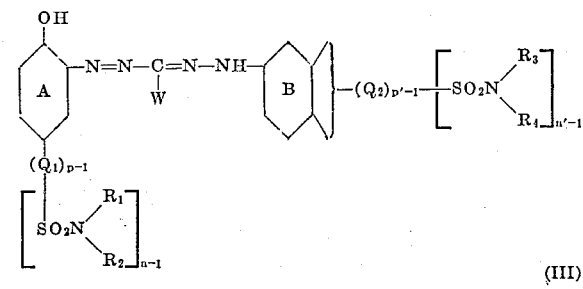

wherein $R_1$, $R_2$, $R_3$ and $R_4$ independently of each other represent hydrogen or an optionally substituted low alkyl group, $Q_1$ and $Q_2$ independently of each other represents a bridging member such as, e.g., phenylenesulphonyl, phenyleneaminosulphonyl or N-alkyl - N - phenyleneamino-sulphonyl, and W represents the phenyl group, or a non-ionogenically substituted phenyl group, of $p$ and $p'$, one $p$ represents 1 or 2 and the other $p$ 1, and of $n$ and $n'$, one $n$ represents 2 and the other $n$ 1 or 2, and wherein the benzene nuclei A and B can contain still further non-ionogenic substituents. If the water solubilising sulphamide group is in the benzene nucleus A, then the benzene nucleus B may contain another water solubilizing sulphamide group and/or non-ionogenic substituents; if, however, this group is in the benzene nucleus B, then the benzene nucleus A contains non-ionogenic substituents, which may also be in other positions, preferably chlorine, or methyl, methylsulfonyl, ethylsulfonyl, acetylamine and nitro groups, instead of the sulfamide group in p-position to the OH— group. These dyestuffs produce very level subdued greyish, e.g., olive-grey to black-grey dyeings on textile material containing polyamide groups, in particular on mixtures of varying qualities of wool. The dyeings have very good fastness to light, rubbing, alkali, milling, washing and sea water.

A sub-group of preferred formazane according to the invention contains compounds of Formula IV

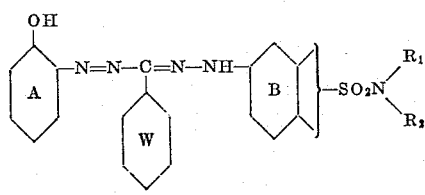

wherein $R_1$ and $R_2$ independently of each other represent hydrogen or a low alkyl group which may be substituted such as the methyl, ethyl or the hydroxyethyl group, and wherein the benzene nucleus A contains non-ionogenic substituents in p-position to the OH-group, and wherein the benzene nucleus A, optionally also in other positions, and the benzene nuclei B and W can contain further non-ionogenic substituents as defined, preferably chlorine, nitro or methyl groups.

The formazane compounds of Formula I are obtained by processes known per se. For example, an aldehyde is condensed with the hydrazine from an amine A—$NH_2$ and the hydrazone obtained is coupled with adiazonium compound from an amine B—$NH_2$, A and B having the meanings given in Formula I, or, preferably, a hydrazine from an amine B—$NH_2$ is condensed with an aldehyde and the hydrazone obtained is coupled with a diazonium compound from an amine A—$NH_2$. Or, for example, one equivalent of a diazonium compound from both an amine A—$NH_2$ and B—$NH_2$ is coupled with a methylene or methine compound which can be coupled twice while splitting off 1 or 2 groups which can easily be split off or while splitting off 1 or 2 groups which can be converted into such groups which can easily be split off such as, e.g., formyl, acetyl, carboxylic acid, carboxylic acid ester amide or nitrile groups.

In both processes, the components are so chosen that the end product contains at least one substituent Z as defined.

Examples of amines A—$NH_2$ and B—$NH_2$ which can be used for this purpose are 2-amino-1-hydroxybenzene or aminobenzene compounds or o-hydroxyaminonaphthalene or aminonaphthalene compounds which can be substituted as defined, e.g., by halogen or nitro, alkyl, aryl, hydrocarbon, carbonyl, alkylsulphonyl, arylsulphonyl, alkylsulphoxy, sulphonic acid amide groups, etc. Examples of such compounds are thus 2-amino-1-hydroxybenzene or 1-aminobenzene or 2-amino-1-hydroxy- or 1-amino-, -4- or -5-chlorobenzene, 2-amino-1-hydroxy-or-1-amino-4- or -5-bromobenzene, 2-amino-1-hydroxy-4-or-5-nitro- or -4,6-dinitrobenzene, 2-amino-1-hydroxy- or 1-amino-4,6-dichloro- or -4,6-dibromo-benzene, 2-amino-1-hydroxy- or 1-amino-4-chloro-6-nitrobenzene, 2-amino-1-hydroxy- or 1-amino-6-chloro-4-nitrobenzene, 2-amino-1-hydroxy-4-methyl- or -ethylsulphonyl- or 5-methyl- or -ethylsulphonyl-benzene, 1-amino-4- or -5-phenyl-sulphonylbenzene, 1-amino-4- or -5-(sulphamylphenyl) - sulphonylbenzene, 5-amino-6-hydroxy-benzoxathiole-5-dioxide, also 2-amino-1-hydroxybenzene- or 1-aminobenzene- '4- or -5-sulphonic acidamide, -methylamide, -dimethylamide, -phenylamide, -N-methyl-N-phenylamide, -N - ethyl - N - 4'-chlorophenylamide, etc., or 2-amino-1-hydroxynaphthalene, 1-amino-2-hydroxynaphthalene or 1- or 2-aminonaphthalene.

Examples of aldehydes which can be used for the reaction with aryl hydrazines are aliphatic aldehydes such as acetaldehyde, trichloroacetaldehyde, propionaldehyde, butyraldehyde, crotonaldehyde, oenanthic aldehyde; cycloaliphatic aldehydes such as cyclohexyl aldehyde; aromatic aldehydes such as benzaldehyde and its nuclear substitution products such as alkyl, halgone, nitro, alkoxy, alkylsulphonyl, arylsulphonyl, alkylsulphoxyl benzaldehydes or benzaldehyde sulphonic acid amides, or naphthaldehydes which may be substituted in the nucleus such as 1- or 2-naphthaldehyde; in addition heterocyclic aldehydes such as furfurol or thiophene-2-aldehyde.

Examples of methylene or methine compounds which can be coupled twice for use in the second method of production of the formazanes of Formula II are cyanoacetic acid esters, nitroacetic acid ester or phenylformyl acetic acid ester and the corresponding nitrile, alkylphenyl formyl acetic acid ester, dinitro phenyl acetic acid, phenylcyanoacetic acid, its esters and amides, naphthyl-formyl acetic acid esters, e.g., α-naphthyl-formyl acetic acid ester.

As agents giving off cobalt, with which the formazanes of Formula I are converted according to the invention into their cobalt complexes of Formula II, water soluble simple or complex salts of di- or tri-valent cobalt are used, preferably cobalt-(II) salts of organic or inorganic acids. On using salts of mineral acids to introduce the cobalt, the metallisation is advantageously performed in the presence of an agent which buffers mineral acid such as, e.g., alkali hydroxide or carbonate or alkali metal salts of low fatty acids, e.g., alkali acetates or alkali metal salts of polybasic phosphorus oxygen acids.

Synthetic polyamides, e.g., nylon, in particular however, natural polyamides such as silk, leather and, chiefly, wool are used as textile material containing polyamide groups which can be dyed or printed with the cobalt-containing formazane dyestuffs according to the invention. Textile material of this type is dyed advantageously with dyestuffs according to the invention which contains 1 to 2 sulfonic acid amide groups as defined; they draw onto these materials even from a neutral to weakly acid bath.

If desired, the water solubility of such dyestuffs is promoted by the admixture of anion active or non-ionogenic wetting or dispersing agents.

The textile dyeings obtained with the dyestuffs according to the invention are grey, olive-green, sometimes blueish or greenish grey to black-grey. They are distinguished in particular by very good fastness to light and rubbing and by very good wet fastness properties such as, e.g., good fastness to washing, alkali, milling, and sea water. Compared with previously known copper complexes which contain one metal atom per mol formazane dyestuff, the dyestuffs according to the invention are distinguished generally in that they dye the mixtures of different qualities of wool more evenly, and in shades which have a better light fastness.

Further details can be seen from the following examples. Where not otherwise expressly stated, parts are given as parts by weight. The temperatures are in degrees Centigrade. The relationship of parts by weight to parts of volume is as that of grams to cubic centimeters.

*Example 1*

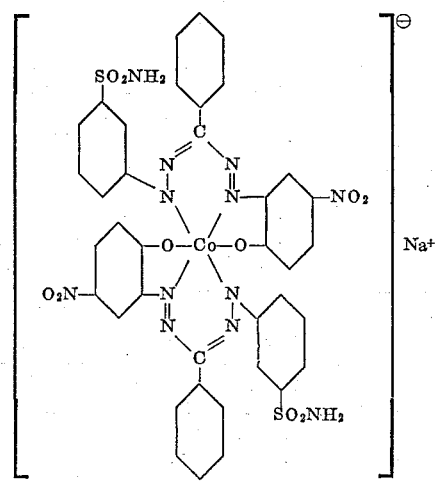

15.4 parts of 4-nitro-2-amino-1-hydroxybenzene are dissolved in 100 parts of hot water and 17.5 parts of concentrated hydrochloric acid, the solution is cooled to 5° and diazotised with a sodium nitrite solution (corresponding to 6.9 parts of sodium nitrite). The reaction mixture is made neutral by the addition of sodium bicarbonate. The yellow diazonium suspension is stirred at 0–3° into a solution of 28.8 parts of benzaldehyde phenyl hydrazone-3'-sulfonic acid amide (produced by condensation of benzaldehyde and phenylhydrazine-3-sulfonic acid amide) in 250 parts by volume of glycol monomethyl ether.

The pH of the coupling mixture is adjusted to 9.5–10 by the addition, at 0–5°, of 5 N sodium hydroxide solution. On completion of the dyestuff formation, the dyestuff is precipitated by the addition of 1000 parts by volume of saturated sodium chloride solution and filtered off. It is washed with dilute sodium chloride solution made into a paste with 600 parts of water, 60 parts by volume of cobalt acetate solution (corresponding to 3.54 parts of cobalt) are added and the mixture is heated for 1 hour at 80–85°. The dyestuff suspension is then made clearly phenolphthalein alkaline by the addition of anhydrous sodium carbonate and it is stirred at 80–85° until the dyestuff has precipitated in a form which can be easily filtered off. The cobalt-containing dyestuff is filtered off and washed with dilute sodium chloride solution. After drying, it is a dark powder which dyes wool from a neutral to weakly acid bath in very level olive/grey shades which have a high degree of wet fastness properties and good fastness to light.

Similar dyestuffs which dye wool in navy blue shades are obtained if, in the above example, the 4-nitro-2-amino-1-hydroxybenzene is replaced by 14.35 parts of 4-chloro-2-amino-1-hydroxybenzene or by 12.3 parts of 2-amino-p-cresol. A similar dye which dyes wool in gray shades can be obtained when the 15.4 parts of 4-nitro-2-amino-1-hydroxybenzene in the above example are substituted by a mixture of 11.5 parts of 4-nitro-2-amino-1-hydroxybenzene and 3.6 parts of 4-chloro-2-amino-1-hydroxybenzene.

*Example 2*

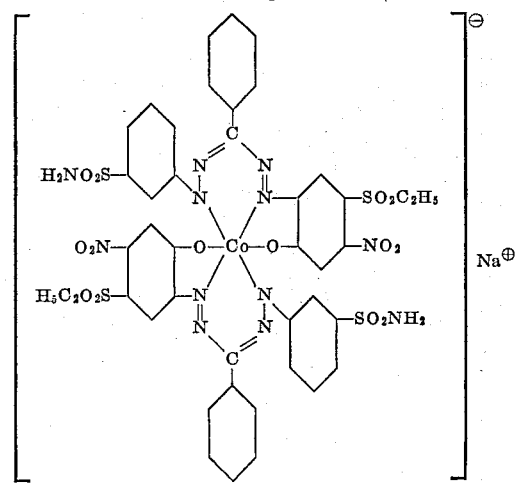

21.4 parts of 5-nitro-4-ethylsulphonyl-2-amino-1-hydroxybenzene are dissolved in 100 parts of water with 16 parts of 30% sodium hydroxide solution, then a water solution of 6.9 parts of sodium nitrite is added. This solution is then added at a temperature of 0–10° to a mixture of 50 parts of ice and 32 parts of concentrated hydrochloric acid.

When completely diazotised, the reaction mixture is made neutral by the addition of sodium bicarbonate. The yellow diazonium suspension is stirred at 0–5° into a suspension of 28.8 parts of benzaldehyde phenyl hydrazone-3-sulphonic acid amide in 200 parts of water and 13 parts of 30% sodium hydroxide solution. After completion of the dyestuff formation the suspension is made acid with acetic acid and the precipitate dyestuff is filtered off.

To form the cobalt complex the dyestuff is made into a paste with 1000 parts of water to which 100 parts by volume of cobalt acetate solution (corresponding to 3.54 parts of cobalt) are added and the mixture is heated one hour at 80–85°. The dyestuff suspension is then made clearly phenolphthalein alkaline by the addition of anhydrous sodium carbonate. 100 parts of sodium chloride are stirred in, whereby the cobalt-containing dyestuff precipitates. The dyestuff is filtered off and washed with a dilute sodium chloride solution. After drying, it is a dark powder which dyes wool from a neutral to weakly acid bath in very level green-olive shades which have a high degree of wet fastness and fastness to light.

Similar dyestuffs which also dye wool in green-olive shades are obtained if, in the above example, the 28.8 parts of benzaldehyde phenyl hydrazone-3-sulphonic acid amide is replaced by the same amount of benzaldehyde phenyl hydrazone-4-sulphonic acid amide, or by 31.9 parts of benzaldehyde phenyl hydrazone-4-sulphonic acid-β-hydroxyethyl amide or by 34.7 parts of benzaldehyde phenyl hydrazone-4-sulphonic acid-N-ethyl-N-β-hydroxyethylamide.

Example 3

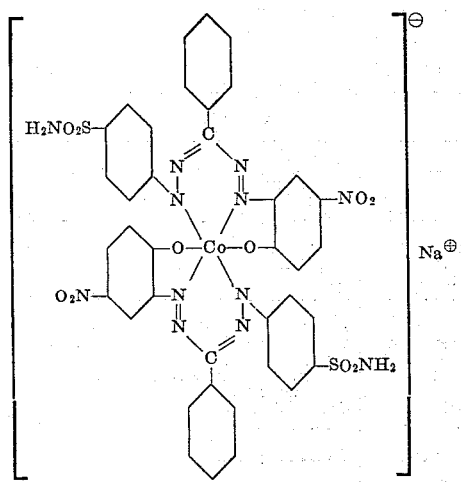

15.4 parts of 4-nitro-2-amino-1-hydroxybenzene are dissolved in 100 parts of hot water with 17.5 parts of concentrated hydrochloric acid, then cooled to 5° and diazotised with a sodium nitrite solution (corresponding to 6.9 parts of sodium nitrite). The yellow diazonium suspension is stirred at 0–3° into a solution of 28.8 parts of benzaldehyde phenyl hydrazone-4-sulphonic acid amide (produced by condensation of benzaldehyde and phenylhydrazine-4-sulphonic acid amide) in 250 parts by volume of pyridine. Through the addition of sodium hydroxide solution the mixture is kept alkaline. After completion of the coupling reaction the solution is stirred into 1000 parts by volume of saturated sodium chloride solution, the precipitated dyestuff is filtered off and washed with dilute sodium chloride solution.

To obtain the cobalt-containing dyestuff the filtrate is stirred to a paste in 1000 parts of water, diluted with a cobalt acetate solution (containing 3.54 parts of cobalt) and heated for an hour at 80–85°. Then the suspension is made alkaline by adding anhydrous sodium carbonate and the dyestuff is precipitated by adding 100 g. of sodium chloride. After filtering and drying it is a dark powder which dyes wool from a neutral to weakly acid bath in very level olive-grey shades which have a high degree of wet fastness and fastness to light.

Similar dyestuffs are obtained if instead of the diazo component used in the example, one of the diazonium compounds given in the following Table I column II is used and if, instead of the hydrazone used, one of those given in column III is used. Column IV gives the shade on wool of the corresponding cobalt complex.

TABLE I

| I No. | II Diazonium compound | III Hydrazone from: | | IV Shade of Co complex on wool |
|---|---|---|---|---|
| | | Hydrazine | Aldehyde | |
| 4 | 2-amino-1-hydroxybenzene-4-sulfonic acid-N-phenylamide-2',4'-bis-sulfonic acid amide. | Phenyl hydrazine | Benzaldehyde | Grey. |
| 5 | 4-phenylsulfonyl-2-aminophenyl-3'-sulfonic acid amide. | do | do | Do. |
| 6 | 2-amino-1-hydroxybenzene-4-sulfonic acid-N-ethyl-N-phenylamide-4'-sulfonic acid amide. | do | do | Do. |
| 7 | 3-amino-4-hydroxyacetophenone | Phenyl hydrazinesulfonic acid amide | do | Reddish-grey. |
| 8 | 2-amino-1-hydroxybenzene-4-sulphonic acid-N-ethylphenylamide-4'-sulphonic acid amide. | Phenyl hydrazine-3-sulphonic acid amine | Benzaldehyde | Grey. |
| 9 | 4-phenylsulphonyl-2-amino-1-hydroxybenzene-3'-sulphonic acid amide. | do | do | Do. |
| 10 | 4-nitro-2-amino-1-hydroxybenzene | do | Furfurol | Greenish-Grey. |
| 11 | 2-amino-1-hydroxybenzene-4-sulphonic acid-N-ethyl-N-phenyl-4'-sulphonic acid amide. | do | do | Grey. |
| 12 | 2-amino-1-hydroxybenzene-4-sulphonic acid amide. | Phenylhydrazine-3-sulphonic acid amide | do | Greenish-Grey. |
| 13 | 4-chloro-2-amino-1-hydroxybenzene | do | do | Grey. |
| 14 | 2-amino-1-hydroxybenzene-4-sulphonic acid amide. | Phenyl hydrazine | 2,6-dichlorobenzaldehyde | Violet-grey. |
| 15 | 4-nitro-2-amino-1-hydroxybenzene | Phenylhydrazine-3-sulphonic acid amide | do | Do. |
| 16 | do | do | 3,4-dichlorobenzaldehyde | Grey. |
| 17 | 4-phenylsulphonyl-2-amino-1-hydroxy-benzene-3'-sulphonic acid amide. | do | Butyraldehyde | Reddish-Grey. |
| 18 | 2-amino-1-hydroxybenzene-4-sulphonic acid-N-ethyl-N-phenylamide-4'-sulphonic acid amide. | do | do | Do. |
| 19 | 4-chloro-2-amino-1-hydroxybenzene | Phenylhydrazine-3-sulphonic acid amide | Butyraldehyde | Reddish blue grey. |
| 20 | 4-phenylsulphonyl-2-amino-1-hydroxybenzene. | do | do | Reddish-grey. |
| 21 | 2-amino-1-hydroxybenzene-4-sulphonic acid amide. | do | do | Do. |
| 22 | 2-amino-1-hydroxybenzene-4-sulphonic acid-N-methylamide. | do | do | Do. |
| 23 | 4-phenylsulphonyl-2-amino-1-hydroxybenzene-3'-sulphonic acid amide. | 4-nitrophenyl hydrazine | Benzaldehyde | Olive-grey. |
| 24 | 5-nitro-2-amino-1-hydroxybenzene | Phenylhydrazine-3-sulphonic acid amide | do | Blue-green. |
| 25 | 2-amino-1-hydroxybenzene-4-sulphonic acid amide. | 4-nitrophenylhydrazine | do | Olive-green. |
| 26 | 2-amino-1-hydroxybenzene-4-sulphonic acid amide. plus 2-amino-1-hydroxybenzene-4-sulphonic acid methylamide. | Phenylhydrazine-3-sulphonic acid amide do | do do | Grey. |
| 27 | 4-ethylsulphonyl-2-amino-1-hydroxybenzene. | do | Benzaldehyde | Grey. |
| 28 | do | Phenylhydrazine-3-sulphonic acid-N-methyl-N-β-hydroxyethylamide. | do | Do. |
| 29 | do | Phenylhydrazine-3-sulphonic acid-β-hydroxyethylamide. | do | Do. |
| 30 | do | Phenylhydrazine-3-sulphonic acid-N-ethyl-N-β-hydroxyethylamide. | do | Do. |
| 31 | 4-ethylsulphonyl-2-amino-1-hydroxybenzene. | Phenylhydrazine-4-sulphonic acid amide | Benzaldehyde | Grey. |
| 32 | do | Phenylhydrazine-4-sulphonic acid-N-methyl-N-β-hydroxyethylamide. | do | Do. |
| 33 | do | Phenylhydrazine-4-sulphonic acid-N,N-di-β-hydroxyethylamide. | do | Do. |
| 34 | 4-nitro-2-amino-1-hydroxybenzene | 1-amino-naphthalene-4,7-di-sulphonic acid amide. | do | Olive. |
| 35 | 4-chloro-2-amino-1-hydroxybenzene | do | do | Do. |

TABLE I—Continued

| No. | Diazonium compound | Hydrazone from: Hydrazine | Hydrazone from: Aldehyde | Shade of Co complex on wool |
|---|---|---|---|---|
| 36 | 4-nitro-2-amino-1-hydroxybenzene | 4-methylphenylhydrazine | Benzaldehyde-4-sulphonic acid amide. | Grey. |
| 37 | ....do.... | 4-methoxyphenylhydrazine | ....do.... | Do. |
| 38 | 4-methylsulphonyl-6-nitro-2-amino-1-hydroxybenzene. | Phenylhydrazine-3-sulphonic acid amide.. | Benzaldehyde | Green-olive. |
| 39 | ....do.... | Phenylhydrazine-4-sulphonic acid amide.. | ....do.... | Do. |
| 40 | 4,6-dinitro-2-amino-1-hydroxybenzene | Phenylhydrazine-3-sulphonic acid amide.. | ....do.... | Do. |
| 41 | ....do.... | Phenylhydrazine-4-sulphonic acid amide.. | ....do.... | Do. |
| 42 | 4-nitro-6-acetylamino-2-amino-1-hydroxybenzene. | Phenylhydrazine-3-sulphonic acid amide.. | ....do.... | Greenish-grey. |
| 43 | 4-nitro-2-amino-1-hydroxybenzene | ....do.... | Hexahydrobenzaldehyde.... | Grey. |
| 44 | 4-chloro-2-amino-1-hydroxybenzene | Phenylhydrazine-4-sulphonic acid amide.. | 1,2,3,6-tetrahydro-benzaldehyde. | Blue-gray. |
| 45 | 4-nitro-6-chloro-2-amino-1-hydroxybenzene.. | Phenylhydrazine-3-sulphonic acid methylamide. | 5-chloro-1,2,3,6-tetrahydro-benzaldehyde. | Gray. |
| 46 | 4-nitro-2-amino-1-hydroxybenzene | Phenylhydrazine-3-sulphonic acid amide.. | Croton aldehyde | Do. |
| 47 | ....do.... | Phenylhydrazine-4-sulphonic acid isopropyl amide. | ....do.... | Do. |
| 48 | 4-methylsulphonyl-6-acetylamino-2-amino-1-hydroxybenzene. | Phenylhydrazine-3-sulphonic acid amide.. | Benzaldehyde | Do. |
| 49 | ....do.... | Phenylhydrazine-4-sulphonic acid butylamide. | ....do.... | Do. |
| 50 | ....do.... | Phenylhydrazine-4-sulphonic acid methylamide. | ....do.... | Do. |
| 51 | 2-amino-1-hydroxybenzene-4-sulphonic acid butylamide. | Phenylhydrazine-3-sulphonic acid N-methyl-N-β-hydroxyethylamide. | 4-methylbenzaldehyde | Do. |
| 52 | 2-amino-1-hydroxybenzene-4-sulphonic acid N,N-dimethylamide. | Phenylhydrazine-3-sulphonic acid-β-cyanethylamide. | 3-methylbenzaldehyde | Do. |
| 53 | 2-amino-1-hydroxybenzene-4-sulphonic acid ethylamide. | Phenylhydrazine-4-sulphonic acid isopropylamide. | 4-methoxybenzaldehyde | Do. |
| 54 | 2-amino-1-hydroxybenzene-4-sulphonic acid propylamide. | Phenylhydrazine-4-sulphonic acid N,N-dimethylamide. | ....do.... | Do. |
| 55 | 4-nitro-2-amino-1-hydroxybenzene | Phenylhydrazine-3-sulphonic acid amide.. | 2-methoxy-1-naphthaldehyde | Black-gray. |
| 56 | 4-methylsulphonyl-2-amino-1-hydroxybenzene. | Phenylhydrazine-3-sulphonic acid amide.. | 2-methoxy-1-naphthaldehyde. | Grey. |
| 57 | 2-amino-1-hydroxybenzene-4-sulphonic acid morpholide. | Phenylhydrazine-3-sulphonic acid-4-methoxyethylamide. | ....do.... | Do. |
| 58 | ....do.... | Phenylhydrazine-3-sulphonic acid-N-ethyl-N-β-hydroxyethylamide. | 2-naphthaldehyde | Do. |
| 59 | 4-(N-methyl-N-acetylamino)-2-amino-1-hydroxybenzene. | Phenylhydrazine-3-sulphonic acid amide.. | Benzaldehyde | Bluish-grey. |
| 60 | 4-(N-methyl-N-methylsulphonylamino)-2-amino-1-hydroxybenzene. | ....do.... | ....do.... | Do. |
| 61 | 4-methylsulphonyl-6-carbomethoxyamino-2-amino-1-hydroxybenzene. | Phenylhydrazine-4-sulphonic acid amide.. | ....do.... | Grey. |
| 62 | 4-methylsulphonyl-6-carbopropoxyamino-2-amino-1-hydroxybenzene. | ....do.... | ....do.... | Do. |
| 63 | 4-nitro-6-methyl-sulphonylamino-2-amino-1-hydroxybenzene. | ....do.... | ....do.... | Do. |
| 64 | 4-nitro-2-amino-1-hydroxybenzene | 4-methyl-3-phenylsulphonyl-phenylhydrazine-3'-sulphonic acid amide. | ....do.... | Olive-grey. |
| 65 | 4-nitro-6-acetylamino-2-amino-1-hydroxybenzene. | Phenylhydrazine-4-sulphonic acid amide.. | ....do.... | Grey. |
| 66 | ....do.... | Phenylhydrazine-3-sulphonic acid-β-hydroxyethyl amide. | ....do.... | Do. |
| 67 | 2-amino-1-hydroxybenzene-4-sulphonic acid amide. | 3-nitro-phenylhydrazine | ....do.... | Olive-grey |
| 68 | ....do.... | 4-chlorophenylhydrazine | ....do.... | Grey |
| 69 | 2-amino-1-hydroxybenzene-4-sulfonic acid amide. | 3-chlorophenylhydrazine | Benzaldehyde | Do. |
| 70 | 4-amyl-6-nitro-2-amino-1-hydroxybenzene.. | Phenylhydrazine-3-sulfonic acid amide.... | ....do.... | Do. |
| 71 | 4-chloro-5-nitro-2-amino-1-hydroxybenzene.. | ....do.... | ....do.... | Greenish grey. |
| 72 | 4-chloro-6-nitro-2-amino-1-hydroxybenzene.. | ....do.... | ....do.... | Grey. |
| 73 | 4-nitro-6-chloro-2-amino-1-hydroxybenzene.. | ....do.... | ....do.... | Do. |
| 73a | 4-bromo-2-amino-1-hydroxybenzene | ....do.... | ....do.... | Do. |
| 73b | 6-nitro-2-amino-1-hydroxybenzene-sulfonic acid-amide. | Phenyl-hydrazine | ....do.... | Green-olive. |
| 73c | ....do.... | 4-methyl-3-phenylsulfonyl-phenylhydrazine-3'-sulfonic acid amide. | ....do.... | Do. |
| 73d | 4-nitro-2-amino-1-hydroxybenzene | Phenylhydrazine-3-sulfonic acid amide.... | 2-methylbenzaldehyde | Grey. |
| 73e | ....do.... | ....do.... | 2-chlorobenzaldehyde | Reddish grey. |

*Example 74*

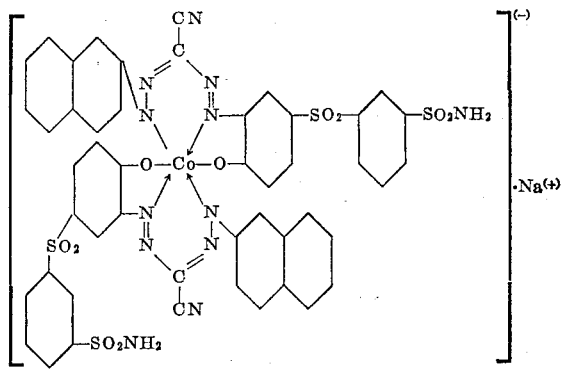

32.8 parts of 4-phenylsulphonyl-2-amino-1-hydroxybenzene-3'-sulphonic acid amide are dissolved in 100 parts of hot water and 21 parts by volume of 10 N sodium hydroxide solution, a solution of 6.9 parts of sodium nitrite is added and, after cooling to 5°, the whole is stirred into a mixture of 42 parts of concentrated hydrochloric acid, 100 parts of water and 50 parts of ice. Traces of excess nitrous acid are decomposed with sulphamic acid.

The mixture is then neutralised with sodium bicarbonate until Congo paper no longer turns blue and the brown-yellow suspension of the diazonium compound is poured at 0–10° into a solution of 11.5 parts of cyanoacetic acid ethyl ester in 200 parts by volume of ethyl alcohol.

The pH of the reaction mixture is then adjusted to 10–10.5 at 0–5° by the addition dropwise of 5 N sodium hydroxide solution.

On completion of the coupling, the reaction product is precipitated by the addition of sodium chloride solution. After filtering off, the filter residue is pasted in 150 parts by volume of glycol monoethyl ether. After the addition of sufficient 5 N sodium hydroxide solution to ensure a strongly alkaline reaction to the end of the saponification, the reaction product is refluxed for 10 to 20 minutes.

The pH of the solution of the saponification product is then adjusted to 10 by the addition of dilute hydrochloric acid, combined with the diazonium compound obtained from 14.3 parts of 2-aminonaphthalene and the pH of the reaction mixture is kept at 10 by the dropwise addition of 5 N sodium hydroxide solution.

On completion of the coupling, the dyestuff is precipitated with sodium chloride solution. It is filtered off and then dissolved in 75 parts by volume of formamide, 15 parts of cobalt acetate (corresponding to 3.54 parts of cobalt) are added at water temperature and the whole is kept at this temperature until the cobalt-containing formazane dyestuff has formed. The dyestuff is then precipitated by the addition of sodium chloride solution.

After filtering off and drying, a dark powder is obtained which dyes wool from a neutral to weakly acid bath in fast brown shades. The dyeings have good general fastness properties.

A similar dyestuff is obtained if, in the above example, the 2-aminonaphthalene is replaced by 14.3 parts of 1-aminonaphthalene. This dyestuff dyes wool in violet brown shades.

*Example 75*

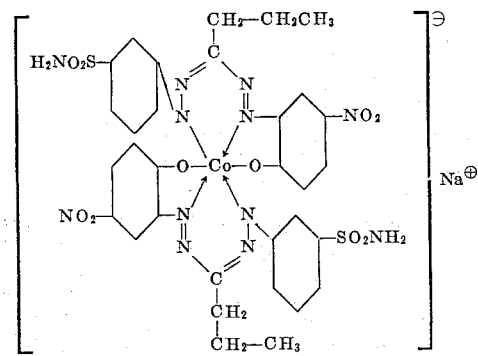

15.4 parts of 4-nitro-2-amino-1-hydroxybenzene are dissolved in 100 parts of hot water and 17.5 parts of concentrated hydrochloric acid, the solution is cooled to 5° and diazotised with a solution of 6.9 parts of sodium nitrite. The mixture is made neutral by the addition of sodium bicarbonate. The yellow diazonium suspension is stirred at 0–3° into a solution of 25.3 parts of hydrazone from phenylhydrazine-3-sulphonic acid amide and butyraldehyde in 250 parts by volume of glycol monomethyl either. The pH of the coupling mixture is adjusted at 0–5° to 9.5–10 by the addition of sodium hydroxide solution.

On completion of the dyestuff formation, the formazane dyestuff is precipitated by the addition of saturated sodium chloride solution. The dyestuff is then filtered off and washed with dilute sodium chloride solution.

The moist dyestuff is pasted in 600 parts of water and metallised at 50–60° by the addition of 60 parts by volume of cobalt acetate solution (corresponding to 3.54 parts of cobalt).

The cobalt-containing dyestuff is precipitated by the addition of sodium chloride, filtered off and dried. After drying, it is a dark powder which dyes wool from a neutral to weakly acid bath in very fast grey-black shades.

*Example 76*

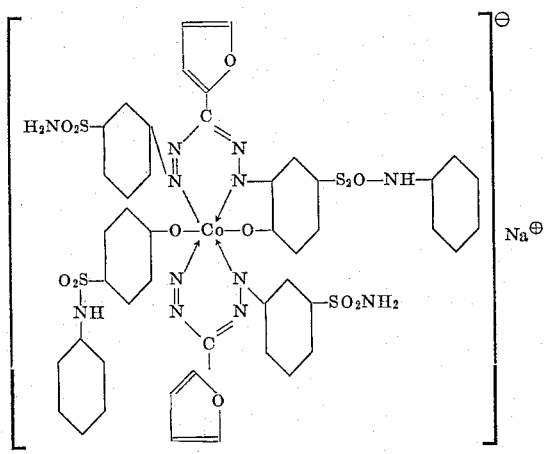

54 parts of formazane dyestuff (obtained by coupling equimolecular amounts of diazotised 2-amino-1-hydroxybenzene-4-sulphonic acid-N-phenylamide with the hydrazone from furfurol and phenylhydrazine-3-sulphonic acid amide as described in Example 3), are dissolved in 600 parts of water and the solution is stirred at 80–85° with 60 parts by volume of cobalt acetate solution (corresponding to 3.54 parts of cobalt), until the cobalt-containing dyestuff has formed. Sodium carbonate is then added until the dyestuff suspension has a clearly alkaline reaction to phenolphthalein paper.

On adding sodium chloride, the cobalt-containing dyestuff precipitates. It is filtered off, washed with dilute sodium chloride solution and dried. The dry dyestuff is a dark powder which dyes wool from a weakly acid to neutral bath in fast greenish grey shades.

Similar dyestuffs are obtained if, in the above example, the 2-amino-1-hydroxybenzene-4-sulphonic acid-N-phenylamide is replaced by 2-amino-1-hydroxybenzene-4-sulphonic acid-N-methylamide.

*Example 77*

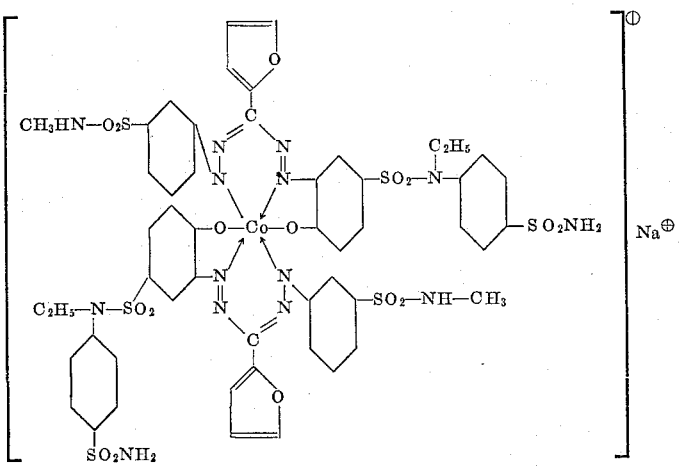

66.1 parts of the formazane dyestuff (obtained by coupling diazotised 2 - amino - 1 - hydroxybenzene - 4 - sulphonic acid - N - ethyl - N - phenylamide - 4' - sulphonic acid amide with the hydrazone from phenylhydrazine-3-sulphonic acid-N-methylamide and furfurol), in 600 parts of water are heated, as described in Example 5, at 80–85° with 60 parts by volume of cobalt sulphate solution (corresponding to 3.54 parts of cobalt) until the cobalt-containing formazane complex has formed. Sodium carbonate is then added to the aqueous suspension of the dyestuff until the reaction is phenolphthalein alkaline. The cobalt-containing formazane dyestuff is precipitated by the addition of sodium chloride, filtered off and washed with dilute sodium chloride solution. After drying, it is a dark powder which dyes wool from a neutral to weakly acid bath in very fast grey shades.

47.7 parts of formazane dyestuff (obtained according to Example 3 by coupling diazotised aminobenzene-3-sulphonic acid amide with the hydrazone from 2-hydrazine - 5 - ethylsulphonyl - 1 - hydroxy benzene and furanol in pyridine) are suspended in 600 parts of water. 60 parts of cobalt acetate solution (corresponding to 3.54 parts of cobalt) are then added to the dyestuff suspension and the whole is stirred at 80–85° until the cobalt-containing formazane dyestuff has formed.

The metal-containing dyestuff is then precipitated by the addition of sodium chloride, filtered off and washed with dilute sodium chloride solution. After drying, the dyestuff is a dark powder which dyes wool from a neutral to weakly acid bath in greenish grey shades which have very good fastness to light, washing and milling.

*Example 78*

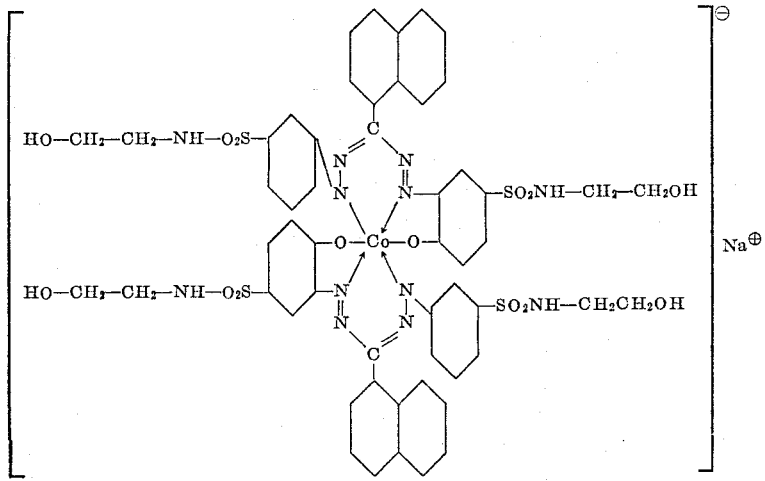

61.2 parts of formazane dyestuff, obtained by coupling diazotised 2 - amino - 1 - hydroxybenzene - 4 - sulphonic acid-N-β-hydroxyethylamide with the hydrazine from phenylhydrazone - 3 - sulphonic acid - N - hydroxyethylamide and α-naphthaldehyde, in 600 parts of water are stirred at 80–85° with a cobalt acetate solution (corresponding to 3.54 parts of cobalt) until the cobalt-containing dyestuff has formed. The completely formed formazane cobalt complex is then precipitated by the addition of sodium chloride. After filtering off and drying, a dark powder is obtained which dyes wool in blue grey shades. The dyeings have good general fastness properties.

Silimar dyestuffs are obtained if, in the above example, the 2 - amino - 1 - hydroxybenzene - 4 - sulphonic acid-N-β-hydroxyethylamide is replaced by equimolar amounts 2 - amino - 1 - hydroxybenzene - 4 - sulphonic acid - N - methylamide or by 2-amino-1-hydroxybenzene-4-sulphonic acid-N-ethylamide.

*Example 79*

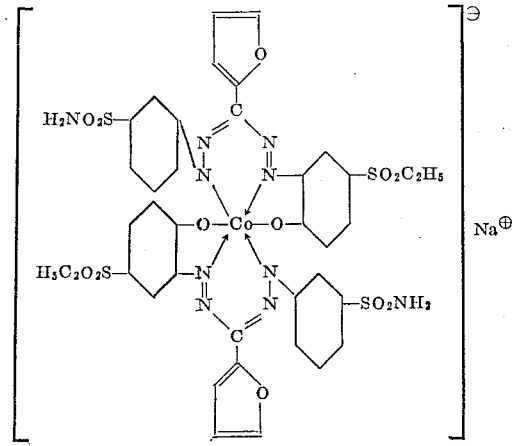

*Example 80*

4 parts of the cobalt-containing dyestuff obtained according to Example 1 are dissolved in 4000 parts of water and 100 parts of previously well wetted wool are entered into the dyebath at 40–50°. The bath is brought to the boil within half an hour, kept for 45 minutes at the boil whereupon the wool is rinsed with cold water and dried. The dark grey dyeing obtained has very good fastness to alkali, wet, rubbing and light.

In another aspect, the present invention concerns another class of new cobalt-containing formazane dyestuffs having similar advantageous properties as those described hereinbefore under the first aspect of this invention, processes for the production of these new dyestuffs, also their use for the dyeing and printing of natural and synthetic textile material containing polyamide groups and, as industrial product, the material dyed or printed therewith.

Among the new dyestuffs according to the second aspect of the invention there are preferred the 1:2 cobalt metal complex dyestuffs of a formazane of the formula

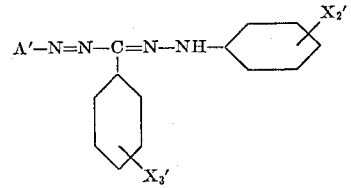

wherein A' is one of the radicals

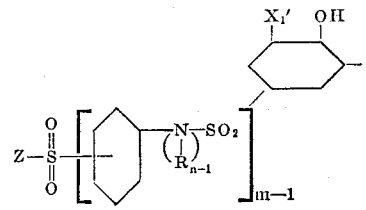

$$NO_2-\underset{\underset{O}{\overset{O}{\underset{\|}{Z-S-}}}}{\phantom{X}}\left[\phantom{X}\underset{\underset{R_{n-1}}{\overset{|}{\phantom{X}}}}{\overset{OH}{\phantom{X}}}\underset{}{\overset{}{\phantom{X}}}-N-SO_2\right]_{m-1}$$

and $$\underset{\underset{O}{\overset{O}{\underset{\|}{Z-S-}}}}{\text{alkyl sulfonyl}}\overset{OH}{\phantom{X}}$$

$X_1'$ represents hydrogen, lower alkanoylamino, lower alkoxy-carbonylamino, lower alkylsulfonylamino, lower alkylsulfonyl or nitro.

$X_2'$ represents hydrogen, chlorine, bromine, lower alkyl, lower alkoxy or nitro, $X_3'$ represents hydrogen, lower alkoxy, lower alkyl, chlorine or bromine, R represents hydrogen, or lower alkyl, Z represents alkyl, mono-chloro-methyl or trifluoromethyl, And each of $m$ and $n$ is an integer ranging from 1 to 2.

The last mentioned class of dyestuffs as well as other valuable cobalt-containing formazane dyestuffs are obtained by reacting one mol of a formazane compound containing no salt-forming group which dissociates acid in water and no sulfamide group, except arylsulphamide groups, and which corresponds to the general Formula I $$\underset{(O)_n=\overset{|}{S}-Z}{\overset{\underset{(Q)_{m-1}}{|}\phantom{XXX}\overset{|}{W}}{X-A-N=N-C=N-NH-B}} \quad (I)$$

wherein A represents an aromatic radical,

B represents an aromatic radical containing no metallisable groups in the o-position to the nitrogen bond, X represents a hydroxyl group in an o-position to the nitrogen linkage to A, Q represents a bridging member, Z represents a low aliphatic hydrocarbon group which may be substituted, W represents a saturated or unsaturated, aliphatic hydrocarbon radical which may be substituted, a cycloaliphatic hydrocarbon radical which may be substituted, an aromatic hydrocarbon radical which may be substituted, or a heterocyclic radical containing no ring nitrogen atoms or the nitro or the cyano group, and $n$ and $m$ represent the numbers 1 or 2, $n$ preferably 2, or by reacting a mixture of formazane compounds of Formula I with an agent giving off less than one mol of cobalt to form a compound which contains two molecules of formazane compounds of Formula I to one cobalt atom.

The dyestuffs according to the invention as defined above must be free from the following groups: water solubilizing groups which dissociate acid in water, such as the $-SO_3H$ or the $-COOH$ group, and sulphamyl groups, such as unsubstituted sulphamyl group as well as sulphamide groups which are N-mono or N,N-disubstituted with low aliphatic hydrocarbon groups or sulphamide groups which are derived from heterocyclic amines.

The new cobalt-containing formazane dyestuffs correspond to the general Formula II $$\left[\begin{array}{c}W_1-C-N\phantom{XX}A_1-(Q)_{m_1-1}-S-Z_1\\ \|\phantom{XXX}\diagup\phantom{X}\diagdown\phantom{X}|\phantom{XXXXX}\|\\ B_1-N\phantom{XX}N\phantom{X}X'_1\phantom{XX}(O)_{n_1}\\ \diagdown\phantom{X}\diagup\\ N-Co-N-B_2\\ \diagup\phantom{X}\diagdown\\ (O)_{n_2}\phantom{XX}X'_2\phantom{X}N\phantom{XX}N\\ \|\phantom{XXXXX}|\phantom{X}\diagdown\phantom{X}\diagup\\ Z_2-S-(Q)_{m_2-1}-A_2\phantom{XX}N-C-W_2\end{array}\right]Y^+ \quad (II)$$

In this formula $A_1$, $A_2$, $B_1$, $B_2$, $Q_1$, $Q_2$, $Z_1$, $Z_2$, $W_1$, $W_2$, $n_1$, $n_2$, $m_1$ and $m_2$ have the meanings given in Formula I for the symbols A, B, Q, Z, W, $n$ or $m$, $X'_1$ and $X'_2$ represent oxygen having two valences which is in an o-position to the nitrogen linkage to $A_1$ or $A_2$, $Y^+$ is the equivalent of a cation, in particular of an alkali metal ion such as the sodium or potassium ion.

A and B in Formula I belong, for example, to the naphthalene or, preferably, the benzene series. The aromatic radicals A, B as well as sometimes also W (W in the meaning of an aromatic hydrocarbon radical which may be substituted or a heterocyclic radical containing no ring nitrogen atoms), can be further substituted as defined. They can contain non-ionogenic substituents, for example, halogens such as fluorine, chlorine or bromine, aliphatic, cycloaliphatic, araliphatic or aromatic groups such as methyl, ethyl, trifluoromethyl or hydroxyethyl groups, cyclohexyl, benzyl groups, phenyl groups which may be substituted, also alkoxy, cycloalkoxy, aralkoxy or aryloxy groups or also cyano, nitro, alkylsulphonyl and arylsulphonyl, alkylsulphoxyl and arylsulphoxyl groups, alkylcarbonyl and arylcarbonyl groups such as acetyl or benzoyl groups or carboxylic acid amide groups, including N-substituted, preferably mono- or di-lower alkyl or N-lower alkyl N-phenyl substituted carbamyl groups, or acylamino groups. As acylamino groups the carbacylamino groups are preferred, especially low alkanoylamino and N-low alkyl-N-low alkanoylamino groups, such as the acetylamino, propionylamino or N-methyl-N-acetylamino group; or low alkoxycarbonyl amino groups, such as the methoxycarbonylamino or the ethoxycarbonylamino group; or low alkylsulphonyl amino and N-low alkyl-N-low alkylsulphonyl amino groups, such as the methylsulphonyl amino, ethyl sulphonyl amino and N-methyl-N-methyl-sulphonyl amino group.

In the meaning of an optionally substituted saturated or unsaturated aliphatic hydrocarbon radical, W is, for example, the methyl, trichloromethyl, ethyl, n-propyl, propylene or n-butyl group. W in the meaning of an optionally substituted cycloaliphatic hydrocarbon radical is, for example, the cyclohexyl group and when W is an optionally substituted aromatic hydrocarbon radical it is preferably the phenyl, the 1- or 2-naphthyl group. If W is a heterocyclic radical containing no ring nitrogen atoms then it is, for example, the furyl-(2) or the thienyl-(2) radical. Heterocyclic rings containing nitrogen are not suitable as, due to their basicity, they tend to salt formation with change in shade. Preferably W is the phenyl, the 1- or 2-naphthyl group, as dyestuffs with particularly good fastness to light are obtained therewith.

When Z is an optionally substituted, low aliphatic hydrocarbon group with preferably 1 to 4 carbon atoms it is, for example, the methyl, chloromethyl, ethyl, propyl or butyl group.

Preferably Z is the $-CH_3$ group as the $-SO_2CH_3$ group corresponding to the $-CH_3$ group promotes particularly good water solubility.

The group $$\underset{(O)_n}{\overset{}{-\overset{\|}{S}-Z}}$$

can sometimes also be bound to the aromatic radical A by way of a bridging member Q. Q is, for example, a phenylene, phenyleneoxy, phenylenethio, phenylenemethylene, sulphonic acid phenyleneamide, sulphonic acid N-alkyl-N-phenyleneamide, carboxylic acid phenyleneamide, phenylenecarbonylamino, phenylenesulphonyl, phenylenecarbonyl, phenylenesulphamyl or a phenylenecarbamyl group.

Valuable, easily accessible cobalt-containing formazane dyestuffs which are distinguished by good dyeing properties, are derived from formazane compounds of Formula I in which A is a radical of the benzene series containing the hydroxyl group in an o-position to the nitrogen bond, B is a radical of the benzene or naphthalene series having no metallisable groups in the o-positions to the nitrogen bond and W is an optionally substituted phenyl or naphthyl radical.

Particularly valuable cobalt-containing formazane dyestuffs of this preferred class according to the invention are derived from formazane compounds of Formula III

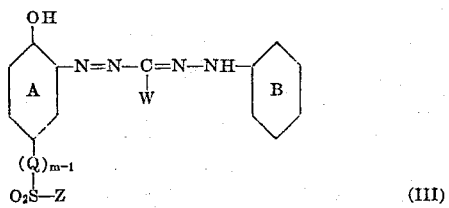

(III)

wherein

Q represents a bridging member such as, e.g. phenylenesulphonyl, N-phenyleneamino-sulphonyl or N-alkyl-N-phenyleneamino-sulphonyl, Z represents an optionally substituted, low aliphatic hydrocarbon group, W represents the phenyl group or a nonionogenically substituted phenyl group and m the numbers 1 or 2, and wherein the benzene nuclei A and B can contain further nonionogenic substituents as defined, preferably chlorine, methyl or nitro groups.

These dyestuffs produce very level, subdued grey, olive, navy blue to black dyeings on textile material containing polyamide groups, in particular on mixtures of different qualities of wool. The dyeings have good fastness to light, rubbing, alkali, milling, washing and sea water.

A sub-group of preferred formazanes according to the invention contains compounds of Formula IV

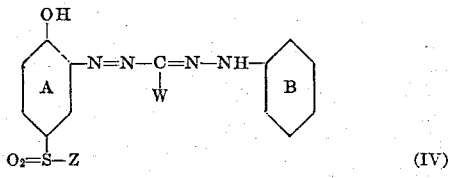

(IV)

wherein

Z represents the —CH₃, —C₂H₅ or —CH₂Cl group and

W represents the phenyl group or a non ionogenically substituted phenyl group and wherein the benzene nuclei A and B can contain further non-ionogenic substituents as defined above.

The formazane compounds of Formula I are obtained by processes known per se. For example, an aldehyde is condensed with the hydrazine from an amine A—NH₂ and the hydrazone obtained is coupled with a diazonium compound from an amine B—NH₂, A and B having the meanings given in Formula I, or advantageously, a hydrazine from an amine B—NH₂ is condensed with an aldehyde and the hydrazone obtained is coupled with a diazonium compound from an amine A—NH₂. Or, for example, one equivalent each of a diazonium compound from an amine A—NH₂ and B—NH₂ is coupled with a methylene or methine compound which can be coupled twice while splitting off 1 or 2 groups which can easily be split off or while splitting off groups which can be converted into groups which can easily be split off such as e.g., formyl, acetyl, carboxylic acid, carboxylic acid ester, amide or nitrile groups.

In both processes, the components are so chosen that the end product contains at least one substituent $$-\underset{(O)_n}{\overset{\|}{S}}-Z$$

as defined bound to the benzene nucleus A or to a bridging member which is bound to A.

Amines A—NH₂ and B—NH₂ which can be used for this purpose are, for example, 2-amino-1-hydroxybenzene or aminobenzene compounds or o-hydroxyaminonaphalene or aminonaphthalene compounds which may be substituted as defined, for example, by halogen or nitro, alkyl, aryl, alkylcarbonyl or arylcarbonyl, acylamino, alkylsulphonyl, arylsulphonyl, alkylsulphoxy groups etc. that is, for example, 2-amino-1-hydroxybenzene or 1-amino-benzene, or 2-amino-1-hydroxy- or 1-amino- 4- or 5- chlorobenzene, 2-amino-1-hydroxy- or 1-amino- 4- or -5-bromobenzene, 2-amino-1-hydroxy- or 1-amino- 4,6-dichloro- or -4,6-dibromo- benzene, 2-amino-1-hydroxy- or 1-amino- 4-chloro-6-nitro- or -6-chloro-4-nitro- benzene, 2-amino-1-hydroxy- or 1-amino- 4- or -5- methylsulphonyl- benzene, 2-amino-1-hydroxy- or 1-amino- 4- or -5-methylsulphoxyl- benzene, 2-amino-1-hydroxy- or 1-amino- 4- or -5-ethylsulphonyl- benzene, 2-amino-1-hydroxy- or 1-amino- 4- or -5-propylsulphonyl- benzene, 2-amino-1-hydroxy- or 1-amino- 4- or -5-butylsulphonyl- benzene, 4-(3'-methylsulphonylphenyl)-sulphonyl - benzene or 5-amino-6 - hydroxybenzoxathiol-S-dioxide, or 2-amino-1-hydroxynaphthalene, 1-amino-2-hydroxynaphthalene or 1- or 2- aminonaphthalene.

Examples of aldehydes which can be used for the reaction with aryl hydrazines are aliphatic aldehydes such as acetaldehyde, trichloroacetaldehyde, propionaldehyde, butyraldehyde, crotonaldehyde, oenanthicaldehyde; cycloaliphatic aldehydes such as hexahydrobenzaldehyde; aromatic aldehydes such as benzaldehyde and its nuclear substitution products such as alkyl-, halogen-, nitro-, alkoxy-, alkylsulphonyl-, arylsulphonyl- alkylsulphoxyl- benzaldehydes or naphthaldehydes which may be substituted in the nuceulus such as 1- or 2- naphthaldehyde, also heterocyclic alehyds such as furfurol or thiophene-2-aldehyde.

As methylene or methine compounds which can be coupled twice for the second method of producing the formazanes of the Formula II are used, for example, cyanoacetic acid ester, nitroacetic acid ester or phenylformylacetic acid ester and the corresponding nitrile, alkylphenyl-formylacetic acid ester, phenyl-cyanoacetic acid or dinitrophenyl-acetic acid, its esters and amides, naphthyl-formylacetic acid esters, e.g., α-naphthyl-formylacetic acid ester.

As compounds giving off cobalt, with which the formazanes of Formula I are converted according to the invention into their cobalt complexes of Formula II, water soluble simple or complex salts of di- or tri-valent cobalt are used, preferably cobalt-(II) salts or organic or inorganic acids. When using salts of mineral acids to introduce cobalt, the metallisation is preferably performed in the presence of an agent which buffers mineral acid such as, e.g., alkali hydroxide or carbonate or alkali salts of low fatty acids, e.g., alkali acetates or alkali salts of polybasic oxygen acids of phosphorus.

Synthetic polyamides, e.g., nylon, in particular, however, natural polyamides such as silk, leather and, chiefly, wool are examples of textile material containing polyamide groups which can be dyed or printed with the cobalt-containing formazane dyestuffs according to the invention. Textile material of this type is dyed advantageously with the dyestuffs according to the invention. They draw onto these materials even from a neutral to weakly acid bath.

The water solubility of such dyestuffs may be promoted further by the admixture of anion active or non-ionogenic wetting or dispersing agents.

The textile dyeings obtained with the dyestuffs according to the invention are brown, grey, sometimes blueish or greenish grey to olive, navy blue or black. They are distinguished in particular by the good fastness to light and rubbing and very good wet fastness properties such as, e.g., good fastenss to washing, alkali, milling and sea water. Compared with previously known copper complexes which contain one metal atom per mol formazane dyestuff, the dyestuffs according to the invention are generally distinguished in that they dye mixtures of different qualities of wool more evenly.

Further details can be seen from the following examples. Where not otherwise expressly stated, parts are given as parts by weight. The temperatures are in degrees centigrade. The relationship of parts by weight to parts by volume is as that of grammes to cubic centimetres.

*Example 1*

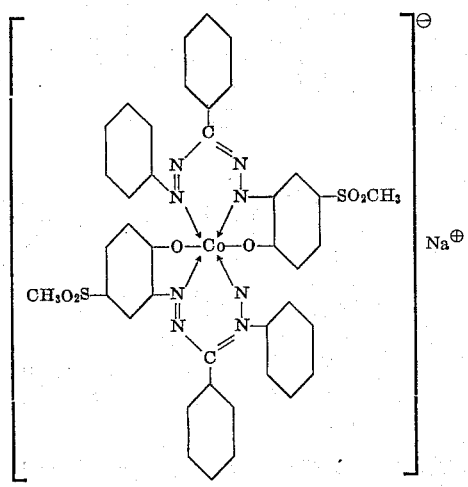

18.7 parts of 4-methylsulphonyl-2-amino-1-hydroxybenzene are dissolved in 100 parts of hot water and 17.5 parts of concentrated hydrochloric acid, the solution is cooled to 5° and diazotised with a sodium nitrite solution (corresponding to 6.9 parts of sodium nitrite). The reaction mixture is made neutral by the addition of sodium bicarbonate. The yellow diazonium suspension is stirred at 0–3° into a solution of 19.7 parts of benzaldehyde phenyl hydrazone (produced by condensing benzaldehyde and phenyl hydrazine) in 250 parts by volume of glycol monomethyl ether.

At 0–5°, the pH of the coupling mixture is adjusted to 9.5–10 by the addition of 5 N sodium hydroxide solution. On completion of the dyestuff formation, the dyestuff is precipitated by the addition of 1000 parts by volume of saturated sodium chloride solution and filtered off. It is washed with dilute sodium chloride solution, pasted in 600 parts of water, 60 parts by volume of cobalt acetate solution (corresponding to 3.54 parts of cobalt) are added and the mixture is heated at 80–85° until the cobalt complex dyestuff is formed. The dyestuff suspension is then made clearly phenolphthalein alkaline by the addition of anhydrous sodium carbonate and after adding 60 parts of sodium chloride the whole is stirred at 80–85° until the dyestuff has precipitated in a form which can be filtered off well. The cobalt-containing dyestuff is filtered off, and washed with dilute sodium chloride solution. After drying, it is a dark powder which dyes wool from a neutral to weakly acid bath in level blue gray shades. The dyeings have good wet fastness properties.

Similar dyestuffs are obtained if, instead of the diazo components used in the example, a diazonium compound given in column II of the following Table 1 is used and instead of the hydrazone, one of the hydrazones given in column III is used. Column IV gives the shade of the corresponding cobalt complex on wool.

| I No. | II Diazonium compound from | III Hydrazone from: | | IV Shade of cobalt-complex on wool |
|---|---|---|---|---|
| | | Hydrazine | Aldehyde | |
| 2 | 4-chloromethylsulphonyl-2-amino-1-hydroxybenzene. | Phenylhydrazine | Benzaldehyde | Grey. |
| 3 | 4-trifluoromethylsulphonyl-2-amino-1-hydroxybenzene. | do | do | Do. |
| 4 | 4-methylsulphonyl-2-amino-1-hydroxybenzene | do | do | Do. |
| 5 | 4-methylsulphonyl-6-acetylamino-2-amino-1-hydroxy benzene. | do | do | Do. |
| 6 | 4-methylsulphonyl-6-carbomethoxyamino-2-amino-1-hydroxybenzene. | do | do | Do. |
| 7 | 4-methylsulphonyl-6-propionylamino-2-amino-1-hydroxybenzene. | do | do | Do. |
| 8 | 4-methylsulphonyl-6-methylsulphonylamino-2-amino-1-hydroxybenzene. | do | do | Do. |
| 9 | 4-ethylsulphonyl-2-amino-1-hydroxybenzene | do | do | Do. |
| 10 | 4-butylsulphonyl-2-amino-1-hydroxybenzene | do | do | Do. |
| 11 | 5-nitro-4-ethylsulphonyl-2-amino-1-hydroxybenzene | do | do | Olive-green. |
| 12 | 6-nitro-4-methylsulphonyl-2-amino-1-hydroxybenzene. | do | do | Do. |
| 13 | 4,6-dimethylsulphonyl-2-amino-1-hydroxybenzene | do | do | Olive-grey. |
| 14 | do | 4-chlorophenylhydrazine | do | Do. |
| 15 | 4-phenylsulphonyl-2-amino-1-hydroxybenzene-3′-methylsulphone. | 4-methylphenylhydrazine | do | Grey. |
| 16 | 2-amino-1-hydroxybenzene-4-sulphonic acid phenylamide-4′-methylsulphone. | 4-methoxyphenylhydrazine | do | Do. |
| 17 | 2-amino-1-hydroxybenzene-4-sulphonic acid N-ethyl-N-phenylamide-4′-methylsulphone. | 4-ethoxyphenylhydrazine | do | Do. |
| 18 | 4-methylsulphonyl-2-amino-1-hydroxybenzene | Phenylhydrazine | 2-methoxy-1-naphthaldehyde | Do. |
| 19 | do | do | 1-naphthaldehyde | Do. |
| 20 | do | 1-naphthylhydrazine | Benzaldehyde | Olive-grey. |
| 21 | do | Phenylhydrazine | 4-methylbenzaldehyde | Grey. |
| 22 | do | do | 4-methoxybenzaldehyde | Do. |
| 23 | do | 4-nitrophenylhydrazine | Benzaldehyde | Olive-grey. |
| 24 | do | 3-nitrophenylhydrazine | do | Do. |
| 25 | 4-chloromethylsulphonyl-2-amino-1-hydroxybenzene. | 4-nitrophenylhydrazine | do | Olive-green. |
| 26 | 4-methylsulphonyl-2-amino-1-hydroxybenzene | 2,5-dichlorophenylhydrazine | 2,6-dichlorobenzaldehyde | Violet. |
| 27 | do | do | Benzaldehyde | Grey violet. |

Example 28

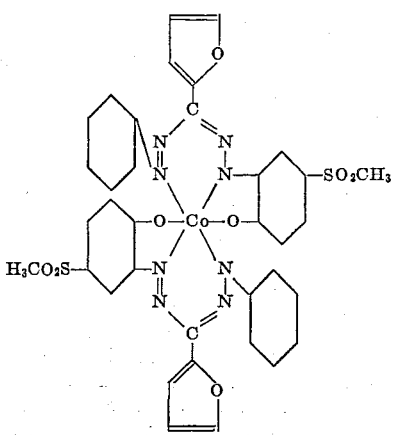

38.4 parts of formazane dyestuff, (obtained by coupling equimolecular amounts of diazotised 4-methylsulphonyl-2-amino-1-hydroxybenzene with the hydrazone from phenyl hydrazine and furfurol), are suspended in 600 parts of water and the suspension is stirred at 80–85° with 60 parts by volume of cobalt acetate solution (corresponding to 3.54 parts of cobalt) until the cobalt-containing dyestuff has formed. Sodium carbonate is then added until the dyestuff suspension clearly has a phenolphthalein alkaline reaction.

After the addition of sodium chloride, the cobalt-containing dyestuff precipitates. It is filtered off, washed with dilute sodium chloride solution and dried. The dry dyestuff is a dark powder which dyes wool from a weakly acid to neutral bath in fast grey shades.

Similar dyestuffs are obtained if, in the above example, the 4-methylsulphonyl-2-amino-1-hydroxybenzene is replaced by equivalent parts of 4-ethylsulphonyl-2-amino-1-hydroxybenzene or by 4-chloromethylsulphonyl-2-amino-1-hydroxybenzene or 4-methylsulphoxide-2-amino-1-hydroxybenzene.

Example 29

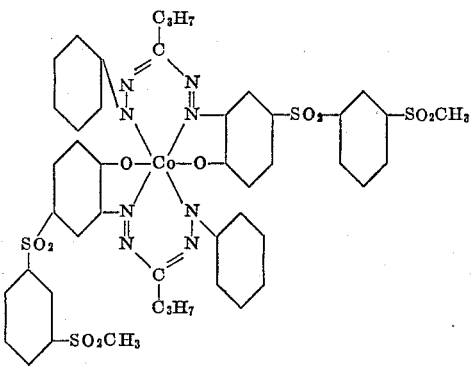

50 parts of formazane dyestuff (obtained by coupling equimolecular amounts of diazotised 4-phenylsulphonyl-2-amino-1-hydroxybenzene-3'-methylsulphone with the hydrazone from phenyl hydrazine and butyraldehyde), are dissolved at 50° in 400 parts of formamide. The solution is stirred with 15 parts of cobalt acetate (corresponding to 3.54 parts of cobalt), until the cobalt-containing dyestuff has formed. On adding saturated sodium chloride solution, the cobalt-containing dyestuff is precipitated. It is then filtered off, washed with dilute sodium chloride solution and dried.

After drying, it is a dark powder which dyes wool from a neutral to weakly acid bath in fast reddish grey shades.

Similar dyestuffs are obtained if, in the above example, the hydrazone from phenyl hydrazine and butyraldehyde is replaced by equivalent parts of the hydrazone from phenyl hydrazine or p-bromo-phenyl hydrazine and crotonic aldehyde or the hydrazone from phenyl hydrazine and hexahydrobenz aldehyde.

Example 30

4 parts of the cobalt-containing dystuff according to example 5 in the table are dissolved in 4000 parts of water and 100 parts of previously well wetted wool are introduced at 40–50° into the dyebath. The bath is brought to the boil within half an hour, kept at the boil for 45 minutes whereupon the wool is rinsed with cold water and dried. The grey dyeing obtained has very good fastness to alkali, wet, rubbing and light.

We claim:
1. A 1:2 cobalt metal complex dyestuff of a formazane of the formula

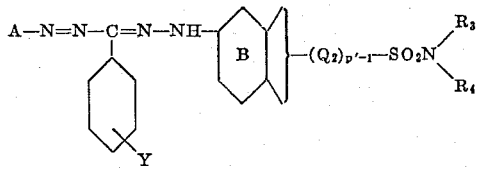

wherein each of $R_3$ and $R_4$ is a member selected from the group consisting of hydrogen, lower alkyl, cyano-lower alkyl, hydroxy-lower alkyl and lower alkoxy-lower alkyl;

$Q_2$ is a member selected from the group consisting of phenylenesulfonyl, N-phenylene-aminosulfonyl, and N-lower alkyl-N-phenylene-sulfonyl, said member being linked via its sulfonyl moiety to the ring B;

A is a member selected from the group consisting of the radicals of the formulas

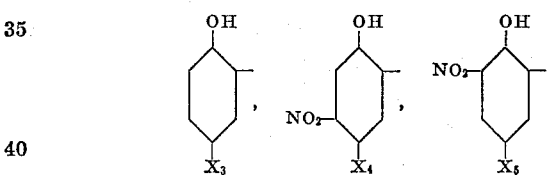

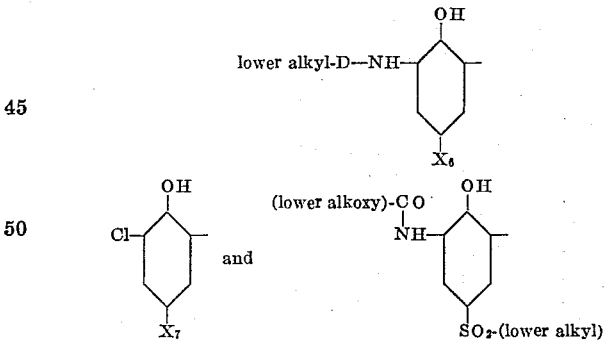

$X_3$ being a member selected from the group consisting of nitro, chloro, bromo, alkyl of from 1 to 5 carbon atoms, lower alkyl-sulfonyl, lower alkanoyl amino, N-lower alkyl-N-lower alkanoylamino, lower alkyl-sulfonylamino and N-lower alkyl-N-lower alkylsulfonylamino;

$X_4$ is a member selected from the group consisting of chlorine, bromine and lower alkylsulfonyl, $X_5$ is a member selected from the group consisting of chlorine, bromine, nitro and lower alkylsulfonyl, $X_6$ is a member selected from the group consisting of nitro and lower alkylsulfonyl, $X_7$ is a member selected from the group consisting of chlorine, and nitro, Y is a member selected from the group consisting of hydrogen, chlorine, bromine, lower alkyl, lower alkoxy and nitro, D is a member selected from the group consisting of —CO— and —$SO_2$—, and $p'$ is an integer ranging from 1 to 2.

2. A 1:2 cobalt metal complex dyestuff of a formazane of the formula

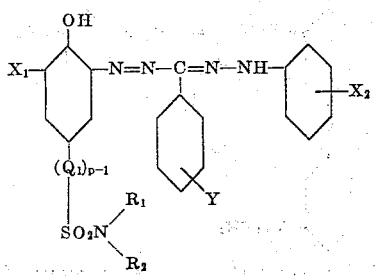

wherein each of $R_1$ and $R_2$ is a member selected from the group consisting of hydrogen, lower alkyl, cyano-lower alkyl, hydroxy-lower alkyl and lower alkoxy-lower alkyl;
$Q_1$ is a member selected from the group consisting of phenylenesulfonyl, N-phenylene-aminosulfonyl, and N-lower alkyl-N-phenylene-sulfonyl, said member being linked via its sulfonyl moiety to the ring A;
$p$ is an integer ranging from 1 to 2,
$X_1$ is a member selected from the group consisting of hydrogen and nitro;
$X_2$ is a member selected from the group consisting of hydrogen, nitro, chlorine, bromine, lower alkoxy and lower alkyl; and
Y is a member selected from the group consisting of hydrogen, chlorine, bromine, lower alkyl, lower alkoxy and nitro.

3. A 1:2 cobalt metal complex dyestuff of a formazane of the formula

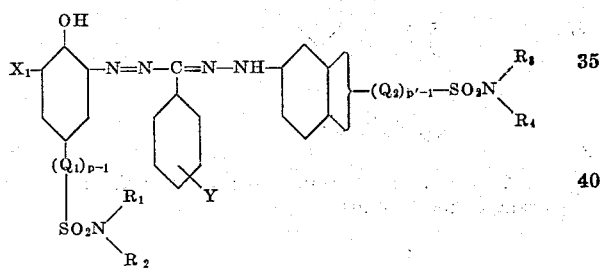

wherein each of $R_1$, $R_2$, $R_3$ and $R_4$ is a member selected from the group consisting of hydrogen, lower alkyl, cyano-lower alkyl, hydroxy-lower alkyl and lower alkoxy-lower alkyl,
each of $Q_1$ and $Q_2$ is a bridging member selected from the group consisting of phenylenesulfonyl, N-phenylene-aminosulfonyl, and N-lower alkyl-N-phenylene-sulfonyl, said member being linked via its sulfonyl moiety to the rings A and B, respectively,
of $p$ and $p'$ one is 1 and the other is an integer ranging from 1 to 2,
Y is a member selected from the group consisting of hydrogen, chlorine, bromine, lower alkyl, lower alkoxy and nitro,
and $X_1$ is a member selected from the group consisting of hydrogen and nitro.

4. A 1:2 cobalt metal complex dyestuff of a formazane of the formula

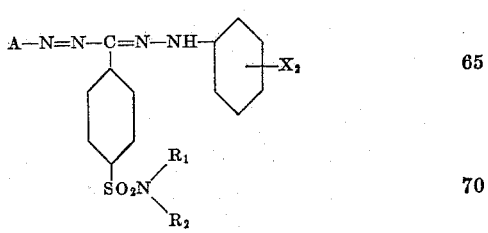

wherein each of $R_1$ and $R_2$ is a member selected from the group consisting of hydrogen, lower alkyl, cyano-lower alkyl, hydroxy-lower alkyl and lower alkoxy-lower alkyl, A is a member selected from the group consisting of the radicals of the formulas

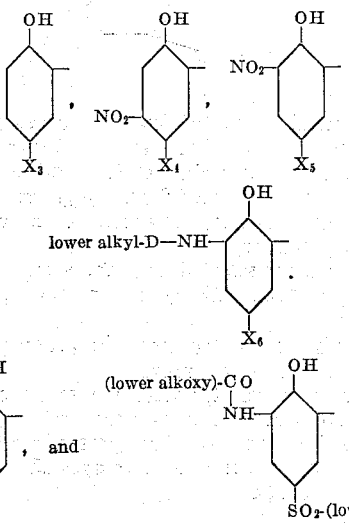

$X_3$ being a member selected from the group consisting of, nitro, chloro, bromo, alkyl of from 1 to 5 carbon atoms, lower alkyl-sulfonyl, lower alkanoyl-amino, N-lower alkyl-N-lower alkanoylamino, lower alkylsulfonylamino and N-lower alkyl-N-lower alkylsulfonylamino;
$X_4$ is a member selected from the group consisting of chlorine, bromine and lower alkylsulfonyl,
$X_5$ is a member selected from the group consisting of chlorine, bromine, nitro and lower alkylsulfonyl,
$X_6$ is a member selected from the group consisting of nitro and lower alkylsulfonyl,
$X_7$ is a member selected from the group consisting of chlorine, and nitro,
Y is a member selected from the group consisting of hydrogen, chlorine, bromine, lower alkyl, lower alkoxy and nitro,
D is a member selected from the group consisting of —CO— and —$SO_2$—, and
$X_2$ is a member selected from the group consisting of hydrogen, nitro, chlorine, bromine, lower alkoxy and lower alkyl.

5. A 1:2 cobalt metal complex dyestuff of a formazane of the formula

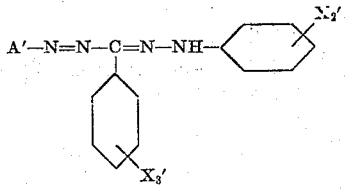

wherein A' is a member selected from the group consisting of the radicals of the formulas

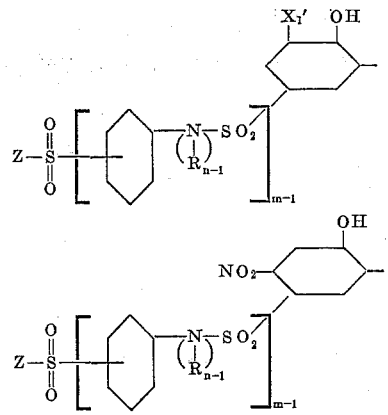

and

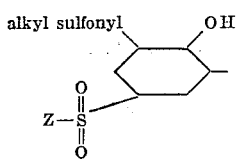

X₁' is a member selected from the group consisting of hydrogen, lower alkanoylamino, lower alkoxy-carbonylamino, lower alkyl sulfonylamino and nitro, X₂' is a member selected from the group consisting of hydrogen, chlorine, bromine, lower alkyl, lower alkoxy and nitro, X₃' is a member selected from the group consisting of hydrogen, lower alkoxy, lower alkyl, chlorine and bromine, R is a member selected from the group consisting of hydrogen and lower alkyl, Z is a member selected from the group consisting of lower alkyl, mono-chloro-methyl and trifluoromethyl, and each of $m$ and $n$ is an integer ranging from 1 to 2.

6. A 1:2 cobalt metal complex dyestuff of the formazane of the formula

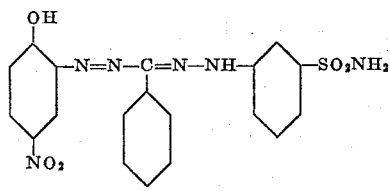

7. A 1:2 cobalt metal complex dyestuff of the formazane of the formula

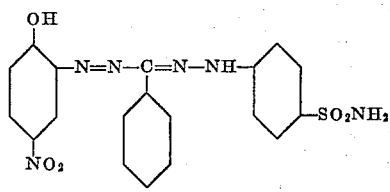

8. A 1:2 cobalt metal complex dyestuff of the formazane of the formula

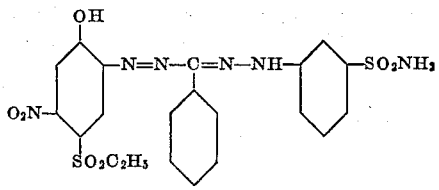

9. A 1:2 cobalt metal complex dyestuff of the formazane of the formula

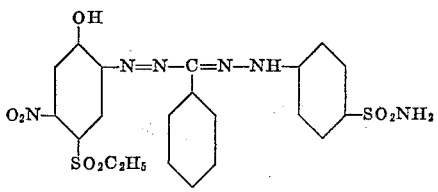

10. A 1:2 cobalt metal complex dyestuff of the formazane of the formula

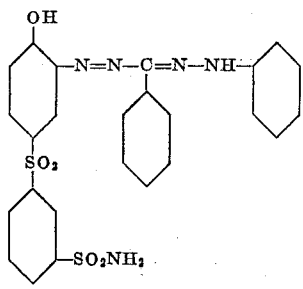

11. A 1:2 cobalt metal complex dyestuff of the formazane of the formula

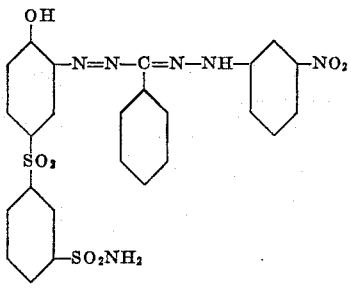

12. A 1:2 cobalt metal complex dyestuff of the formazane of the formula

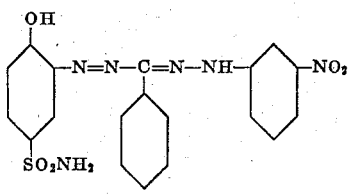

13. A 1:2 cobalt metal complex dyestuff of the formazane of the formula

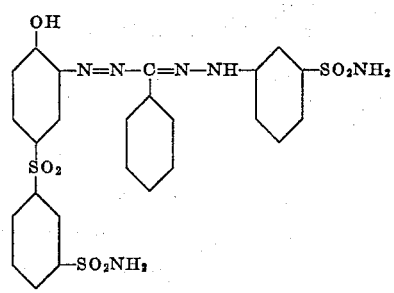

14. A 1:2 cobalt metal complex dyestuff of the formazane of the formula

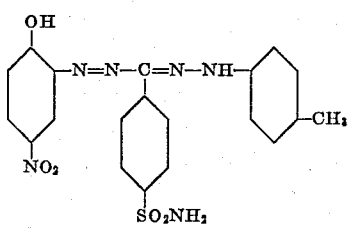

15. A 1:2 cobalt metal complex dyestuff of the formazane of the formula

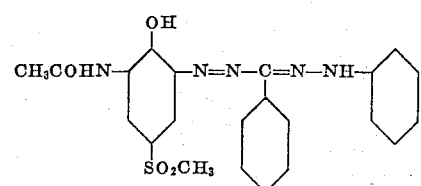

16. A 1:2 cobalt metal complex dyestuff of the formazane of the formula

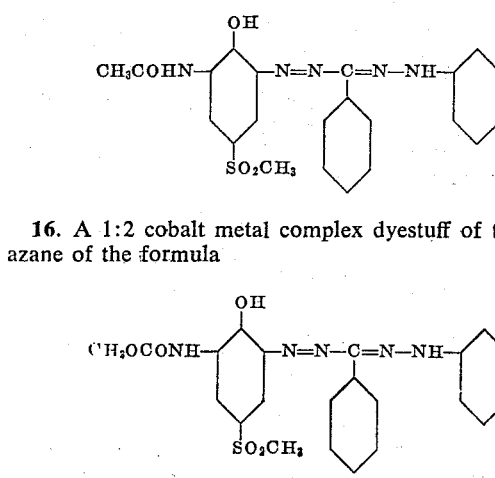

17. A 1:2 cobalt metal complex dyestuff of the formazanes of the formulas
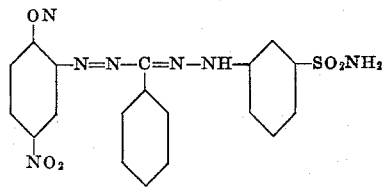
and
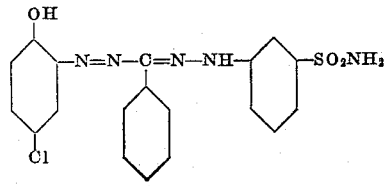
wherein the molar ratio of the first to the second formazane ranges from 3:1 to 1:3.
References Cited by the Examiner
UNITED STATES PATENTS
2,662,074 12/1953 Brooks _____ 260—149
2,662,075 12/1953 Brooks _____ 260—149
FOREIGN PATENTS
1,276,586 10/1961 France.
CHARLES B. PARKER, *Primary Examiner.*
F. D. HIGEL, *Assistant Examiner.*